(12) United States Patent
Clara et al.

(10) Patent No.: US 8,027,279 B2
(45) Date of Patent: Sep. 27, 2011

(54) ECHO CANCELLATION

(75) Inventors: Martin Clara, Villach (AT); Christian Fleischhacker, Pischeldorf (AT); Wolfgang Klatzer, Mittertrixen (AT); Tina Thelesklav, Landskron (AT)

(73) Assignee: Lantiq Deutschland GmbH, Neubiberg (DE)

( * ) Notice: Subject to any disclaimer, the term of this patent is extended or adjusted under 35 U.S.C. 154(b) by 1023 days.

(21) Appl. No.: 11/856,071

(22) Filed: Sep. 17, 2007

(65) Prior Publication Data

US 2009/0073903 A1  Mar. 19, 2009

(51) Int. Cl.
*H04B 3/20* (2006.01)
*H04M 1/58* (2006.01)

(52) U.S. Cl. ........ 370/286; 341/143; 341/144; 341/145; 370/290; 370/465; 370/523; 375/222; 375/234; 375/260; 375/296; 375/350; 379/399.01; 379/406.01; 379/406.08; 379/406.09; 381/71.2; 455/570; 708/322

(58) Field of Classification Search ............... 370/286, 370/290, 465, 523; 375/219, 222, 377, 234, 375/260, 296, 350; 379/406.01, 406.08, 379/399.01, 406.09; 708/322; 331/16, 34; 341/143, 144, 145; 381/71.2; 455/335, 570
See application file for complete search history.

(56) References Cited

U.S. PATENT DOCUMENTS

| | | | |
|---|---|---|---|
| 4,799,214 A | 1/1989 | Kaku | |
| 5,130,943 A * | 7/1992 | Gazsi et al. | 708/322 |
| 5,222,084 A * | 6/1993 | Takahashi | 370/290 |
| 5,521,949 A * | 5/1996 | Huang et al. | 375/377 |
| 6,542,447 B1 | 4/2003 | Matsuo et al. | |
| 6,611,594 B1 * | 8/2003 | Benesty et al. | 379/406.09 |
| 6,618,480 B1 | 9/2003 | Polley et al. | |
| 6,754,187 B1 * | 6/2004 | Barnes et al. | 370/286 |
| 6,795,494 B1 * | 9/2004 | Phanse et al. | 375/219 |
| 6,845,252 B2 * | 1/2005 | Digiandomenico et al. | 455/570 |
| 6,978,012 B2 * | 12/2005 | Casper | 379/406.01 |
| 6,983,047 B1 * | 1/2006 | Chadha et al. | 379/406.01 |
| 6,987,782 B2 * | 1/2006 | Lai | 370/523 |
| 7,016,487 B1 * | 3/2006 | Kwon | 379/406.01 |
| 7,027,593 B2 * | 4/2006 | Boland | 379/406.1 |
| 7,065,133 B1 * | 6/2006 | Phanse et al. | 375/219 |
| 7,065,207 B2 * | 6/2006 | Barron et al. | 379/406.07 |
| 7,129,871 B1 | 10/2006 | Venes et al. | |
| 7,180,869 B2 * | 2/2007 | Spencer | 370/252 |
| 7,187,315 B2 * | 3/2007 | Bruno et al. | 341/145 |
| 7,269,211 B2 * | 9/2007 | Lin et al. | 375/222 |
| 7,279,993 B2 * | 10/2007 | Bruno et al. | 331/34 |
| 7,304,961 B2 * | 12/2007 | Huang et al. | 370/286 |
| 7,349,482 B2 * | 3/2008 | Kim | 375/260 |
| 7,468,957 B2 * | 12/2008 | Baba | 370/286 |
| 7,492,840 B2 * | 2/2009 | Chan | 375/346 |
| 7,536,007 B2 * | 5/2009 | Yeh et al. | 379/406.08 |
| 2001/0002818 A1 * | 6/2001 | Braun | 341/143 |
| 2003/0060163 A1 * | 3/2003 | Filkins et al. | 455/67.1 |
| 2003/0109242 A1 * | 6/2003 | Ohtaki | 455/335 |
| 2006/0071719 A1 * | 4/2006 | Bruno et al. | 331/16 |
| 2006/0071837 A1 * | 4/2006 | Bruno et al. | 341/144 |
| 2006/0222173 A1 * | 10/2006 | Lin et al. | 379/406.08 |
| 2007/0019718 A1 * | 1/2007 | Heise | 375/222 |
| 2008/0310330 A1 * | 12/2008 | Agazzi et al. | 370/286 |
| 2009/0041258 A1 * | 2/2009 | Nakajima | 381/71.2 |
| 2009/0073903 A1 * | 3/2009 | Clara et al. | 370/286 |

* cited by examiner

OTHER PUBLICATIONS

Cormac Conroy et al., A CMOS Analag Front-End IC for DMT ADSL, ISSCC99 / Session 14 / Paper TP 14.2, 1999 IEEE Internation Solid-State Circuits Conference, 240, 241, 465, 0-7803-5126-6/99 (3 pages).

*Primary Examiner* — Gerald Gauthier
(74) *Attorney, Agent, or Firm* — SpryIP, LLC

(57) ABSTRACT

Embodiments related to echo compensation have been described and depicted.

16 Claims, 5 Drawing Sheets

ECHO CANCELLATION

BACKGROUND

In communication systems, transceivers often transmit and receive signals simultaneously, for example during a wired or wireless full duplex communication. Typically, the transmit signal is higher than the receive signal causing problems because a portion of the transmission signal, which is referred to as echo, may leak from the transmit path into the receive path of the transceiver. The echo interferes with the receive signal and adds additional distortion to the receive signal. The echo signal in the receive signal may be eliminated or reduced by replicating the echo and subtracting the replication of the echo from the receive signal. As the echo depends on the power level of the transmit signal and the transfer function between the receive and transmit path, the echo can be replicated by generating a duplicate or replica of the transmit signal, for example by tapping the transmit signal, and filtering the replica signal with a filter having a filter functions corresponding or similar to the echo transfer function.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. may have assigned the same reference number.

Figure 1:
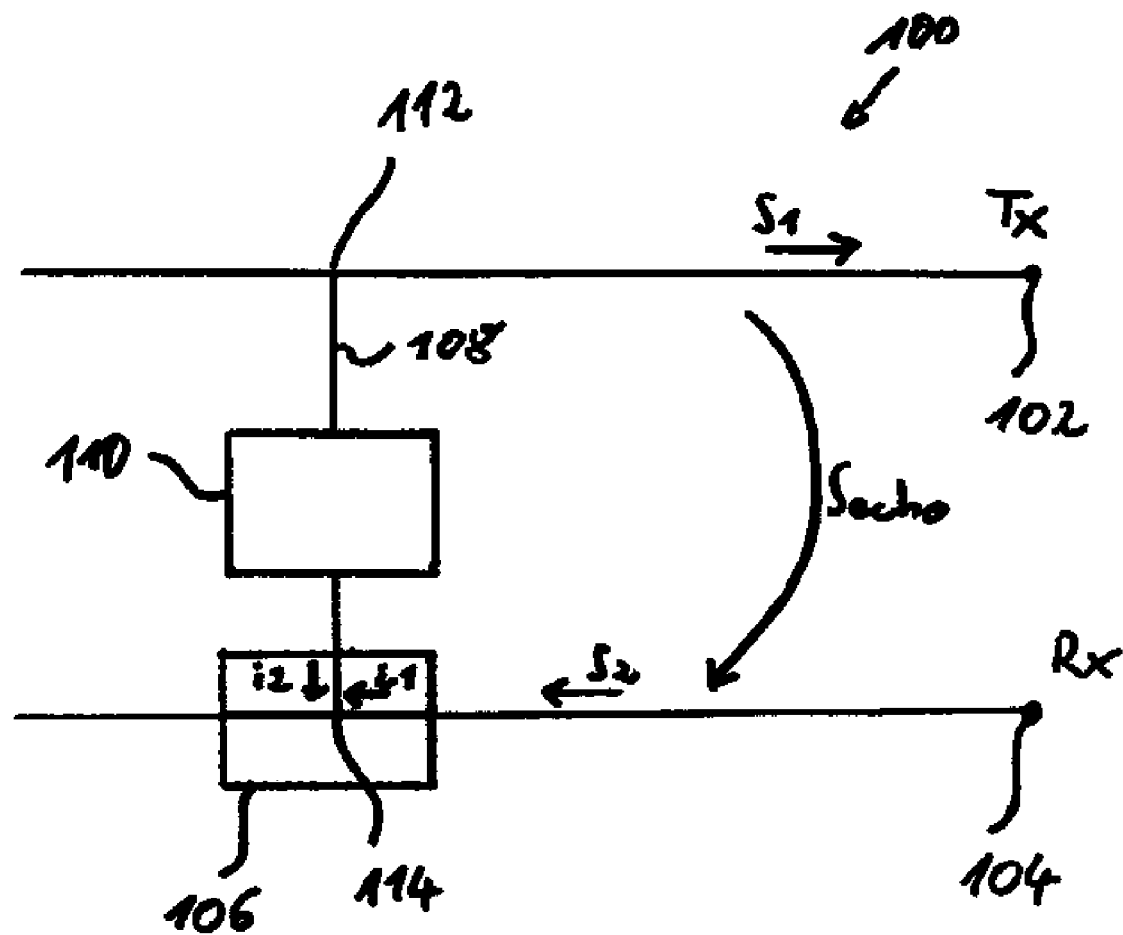
FIG. 1 shows a block diagram according to an embodiment of the present invention.

Referring to FIG. 1, a transceiver 100 for communication comprises a transmit path Tx and a receive path Rx. The transceiver according to FIG. 1 may be a wired-line transceiver for example a DSL-transceiver. However, other embodiments may include other types of transceivers including wireless transceivers, for example a mobile phone transceiver.

An output 102 of the transmit path Tx and an input of the receive path Rx may be coupled to an entity capable of transmitting signals S1 supplied by the transmit path over a communication channel to a far end receiver and receiving signals S2 from a far end transmitter over the communication channel. For example, the transmit and receive paths may be coupled to a hybrid circuit coupling the receive and transmit paths to a bidirectional wired communication line, for example a twisted pair copper wire of a subscriber line. In other embodiments, the transmit path and the receive path may be coupled to an antenna for radiating and receiving radio frequency signals or other wireless signals. As shown in FIG. 1, the receive path comprises a variable gain amplifier 106 having an input connected to the input 104 of the receive path Rx. It is to be noted that the transmit path and receive path may comprise additional circuit elements and circuit blocks which are not shown in FIG. 1 such as amplifiers including but not limited to operational amplifiers, line drivers, power amplifiers, low noise amplifiers, circuitry, transformer etc. Furthermore, although not shown in FIG. 1, the transmit and receive paths may comprise analog and digital portions.

As indicated in FIG. 1, a portion Secho of the transmitted signal S1, in the following referred to as echo, couples from the transmit path to the receive path adding distortion to the signal S2 received from line 104. The characteristics of the echo depend for example on the configuration and implementation of the hybrid, transformers, line impedance characteristics or characteristics of other elements in the communication system.

In order to compensate for the distortion resulting from the signal Secho, an echo cancellation path 108 is provided in the transceiver 100. As shown in FIG. 1, the echo cancellation path 108 comprises a filter 110 also referred to echo cancellation filter having a filter function replicating the echo transfer function between the transmit and receive paths.

The input of the filter 110 is coupled to a node 112 of the transmit path Tx to generate a replica or duplicate of the transmit signal S1. The replica of the transmit signal is provided to the echo cancellation filter 110 to generate a replica of the echo signal Secho. The output of the echo cancellation filter 110 is coupled to a circuit node 114 of the variable gain amplifier 106 for providing current to a node of the variable gain amplifier 106. According to embodiments described below, the circuit node 114 may be a virtual ground node of the variable gain amplifier 106.

The variable gain amplifier 106 may be implemented in an AGC (automatic gain control) circuit provided in the receive path for adjusting the power level of the receive signal. As described above, in addition to the variable gain amplifier 106, other amplifier circuits may be provided in the receive path Rx.

The above configuration provides echo cancellation in current mode by injecting a first current (or a first current signal) I1 and a second current (or a second current signal) I2 directly to the circuit node 114 of the variable gain amplifier. In the embodiment described with respect to FIG. 1, the first current I1 represents the receive signal S2 and the second current I2 represents the compensation signal derived from the transmitted signal.

Figure 2:
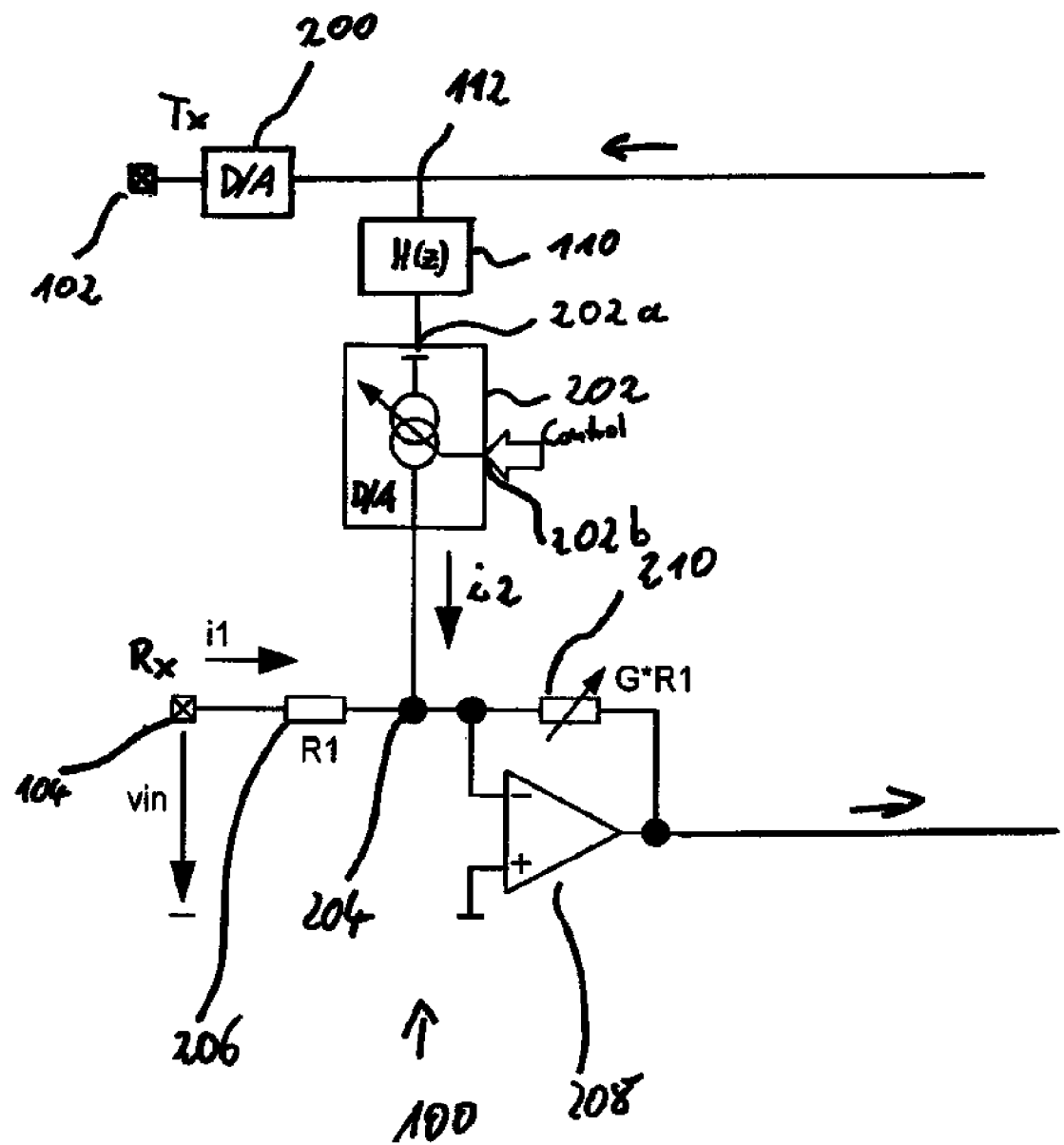
FIG. 2 shows a circuit representation according to an embodiment of the present invention.

A more detailed implementation of an embodiment of transceiver 100 will now be described with respect to FIG. 2. FIG. 2 shows transceiver 100 having implemented a programmable D/A (digital-to-analog) converter in the transmitter 100 for providing current i2 injected to the node 114 of the variable gain amplifier according to a control signal.

In the transceiver 100 according to FIG. 2, transmit path Tx comprises a first D/A converter 200 coupled between node 112 and output 102. D/A converter 200 receives a digital representation of the transmit signal S1 and converts same into an analog signal which is then transmitted over the communication channel to the far-end receiver. The analog signal may be amplified, for example by a line driver or a power amplifier.

According to this embodiment, the replica of the transmit signal S1 generated at node 112 is a digital representation. Correspondingly, echo cancellation filter 110 is implemented as a digital filter, for example an adaptive digital filter. In order to convert the digital representation into the current i2 injected into node 114, a second D/A converter 202 is provided. A digital input 202a of the D/A converter 202 is connected to the output of the echo cancellation filter 110 to receive digital data output by the echo cancellation filter. An output of the D/A converter 202 is directly connected to the node 114 to inject the current i2 generated by the D/A converter 202 based on the received digital representation into node 114 for subtracting the echo.

D/A converter 202 comprises a second input 202b for programming or varying the current generated by the D/A converter 202 according to a control signal received at the control input 202b.

As will be described in more detail below, the above implementation may allow to set a first digital gain factor in the filter function of filter 200 in order to scale the digital representation to the maximum input range or input scale of D/A converter 202 (which may be referred in the following as full scale amplifying in digital domain) and to provide information related to a rescale factor to the D/A converter to rescale or compensate within the D/A converter for the first digital gain factor.

The full scale amplifying in digital domain with a first gain (hereinafter referred to as digital gain) is compensated in analog domain by programming the D/A converter 202 based on a second gain (hereinafter referred to as analog gain), the analog gain depending on the digital gain provided in the full scale amplifying in digital domain.

In view of the above, the control signal received at the input 202b of the D/A converter represents the second gain factor which is correlated to the first digital gain factor in order to compensate the full scale amplifying in digital gain. According to one embodiment, the second gain is the inverse of the first gain. To set the first and second gain factors and to generate corresponding control signals, a controller may be coupled to the filter 110 and the input 202b of the D/A converter 202 to calculate and set the digital and analog gain as described above.

According to embodiments, controlling of the second gain D/A converter 202 is implemented by controlling one or a plurality of conversion elements, for example current cells, provided in the D/A converter for the digital-to-analog conversion. To this end, a control signal (Control) is applied to the input 202b of D/A converter 202 to compensate for the gain provided in the full scale amplifying in D/A.

By implementing the D/A converter programmable or controllable, the circuitry to set the analog gain is integrated into the digital-to-analog circuitry providing a hybrid D/A converter with analog gain setting functionality.

According to one embodiment, the D/A converter 202 is a switched-current D/A converter comprising a plurality of current cells. In embodiments, the D/A converter 202 may be implemented as a passive D/A converter. In a passive D/A converter, transistors are provided only for implementing the current sources in the current cells while transistors are not used for other any active circuits such as amplifying circuits.

D/A converter 202 outputs current i2 to one branch of summing node 204. A further branch of summing node 204 is connected to input 104 via a resistor 206. Resistor 206 is provided in order to convert a signal received at input 104 into current i1 provided to the summing node 204. A branch of node 204 for outputting the summing result is connected to an inverting input of an operational amplifier (opamp) 206. The non-inverting input of opamp 206 is coupled to a fixed reference potential, for example ground. It is to be noted here that node 204 represents a virtual ground node as is common to a person skilled in the art.

Opamp 206 comprises a feedback loop having a variable resistor 210 for setting a gain of the opamp 206. The output of opamp 206 is connected to further processing circuits not shown in FIG. 2.

By feeding the current i2 to node 204, an echo compensation of current i1 is provided. In other words, in the embodiments, the echo compensation information is contained in the current i2 and by summing current i1 and i2, echo compensation is achieved for the transceiver 100. In embodiments, the current i2 may approximately have the same magnitude as current i1 with however opposite sign allowing the opamp to compensate when the echo signal is much higher than the received signals and allowing a high gain for amplifying the compensated receive signals.

Figure 3:
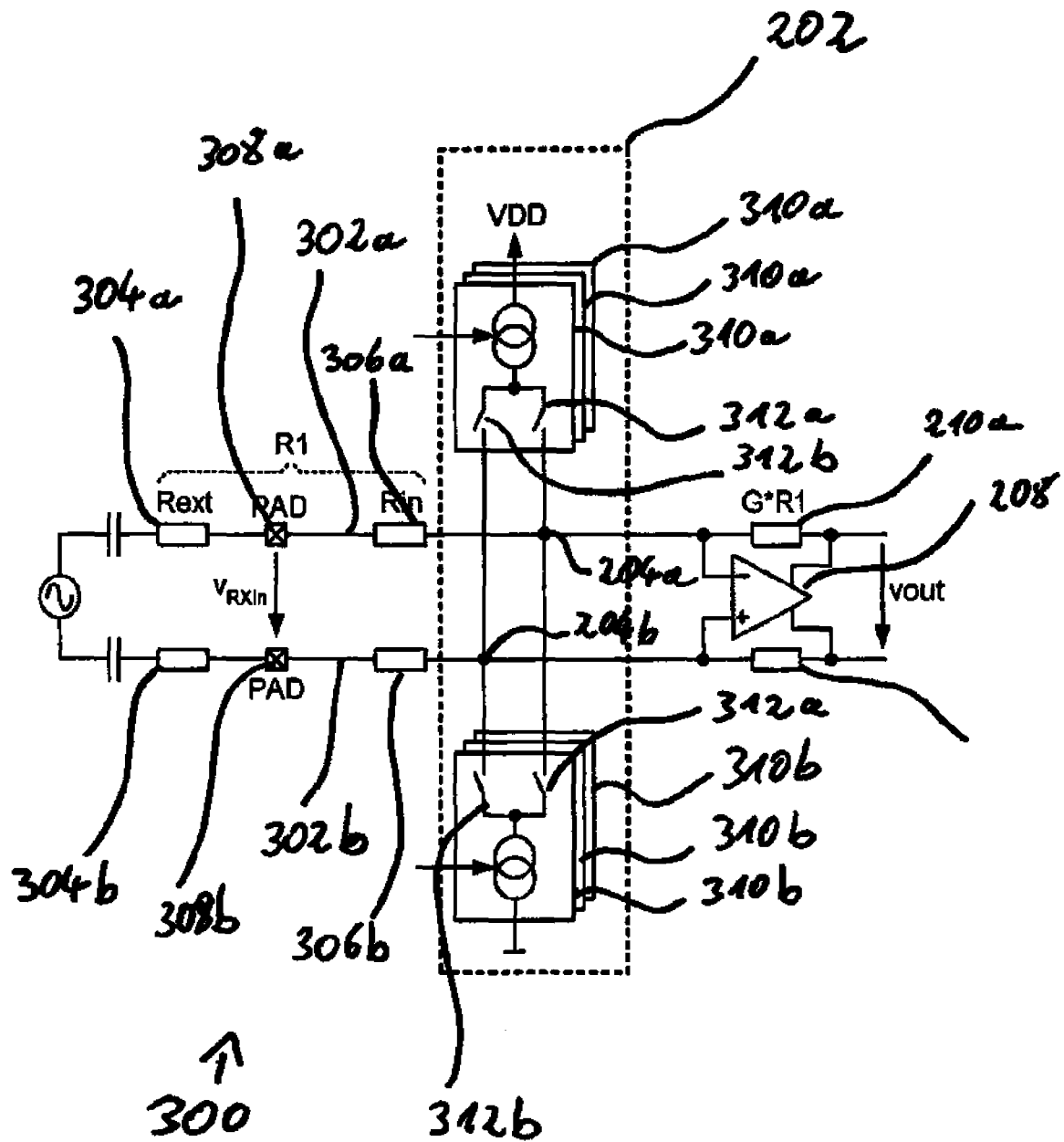
FIG. 3 shows a circuit representation according to an embodiment of the present invention.

Referring now to FIG. 3, a further embodiment is described wherein a differential receiving circuit 300 is implemented having a current-mode echo compensation. While FIG. 3 shows only the receive paths, it is to be understood that the transmit path and the echo path may be implemented as described above with respect to FIG. 2. Accordingly, reference is made to the description of the transceiver according to FIG. 2.

The differential receiving circuit 300 comprises a first rail 302a and a second rail 302b. In the embodiment according to FIG. 3 a D/A converter 202 operates in push-pull manner to allow echo compensation in current mode.

In the embodiment according to FIG. 3, for each rail the resistance R1 is split into an external resistor 304a, 304b and internal resistors 306a and 306b. The internal resistors 306a and 306b are provided on-chip while the external resistors 306a and 306b are provided off-chip. The internal and external resistors are connected via pad terminals 308a and 308b. The splitting of the resistance R1 into two resistors allows reducing the swing of the voltage at the terminals 308a and 308b. However it is to be noted that the resistance R1 may also be implemented by a single resistor as described with respect to FIG. 2.

As described above, the D/A converter 202 is implemented in a push-pull arrangement. To this end, a first plurality of conversion elements 310a and a second plurality of second conversion elements 310b are provided. Each conversion element of the first and second plurality of conversion elements comprises a first switch 312a and a second switch 312b to selectively connect the output of the conversion elements to a branch of nodes 204a and 204b provided between resistance R1 and the inputs of opamp 208. As can be seen in FIG. 3, the opamp 208 is implemented in this embodiment as fully-differential opamp and feedback paths are provided for feeding back a first output of the opamp 202 to the inverting input via a variable resistor 210a and a second output to the non-inverting input via a variable resistor 210b.

According to other embodiments, instead of providing a first and second switch for each cell, a first and second switch may be provided for each plurality of cells in order to selectively connect all of the first and all of the second plurality of current cells to nodes 204a and 204b. It is to be noted here, that the switches can also be operated to fully shut down the echo cancellation.

Each of the conversion elements comprises an input to receive the control information as outlined with respect to FIG. 2 in order to allow rescaling for the digital gain provided in the full scale amplifying of the first D/A converter 200 which is not shown in FIG. 3 by an analog gain.

While the transmission circuitry including the first D/A converter 200 and filter 110 is not shown in FIG. 3, the same arrangement and operation as provided for the received signals described with respect to FIG. 2 may be provided for a transceiver including the receiving circuit as described in FIG. 3.

According to one embodiment, rescaling for the full scale amplifying can be provided by programming current sources provided in each conversion element to have an output current depending on the analog gain. To this end, each of the conversion elements may be programmable or controllable depending on the analog gain, i.e. may receive a signal to vary the output current depending on a scaling factor of the analog gain. The programming may be achieved by inputting a control signal indicating the analog gain factor to a common control input similar to the control input 202b described with respect to FIG. 2 and providing signals based on the control signal to each of the current sources of the conversion elements to allow for each current source the setting of the output current depending on the analog gain.

The arrangement and operation of the first and second plurality of conversion elements will now be described in more detail with respect to FIG. 4.

Figure 4:
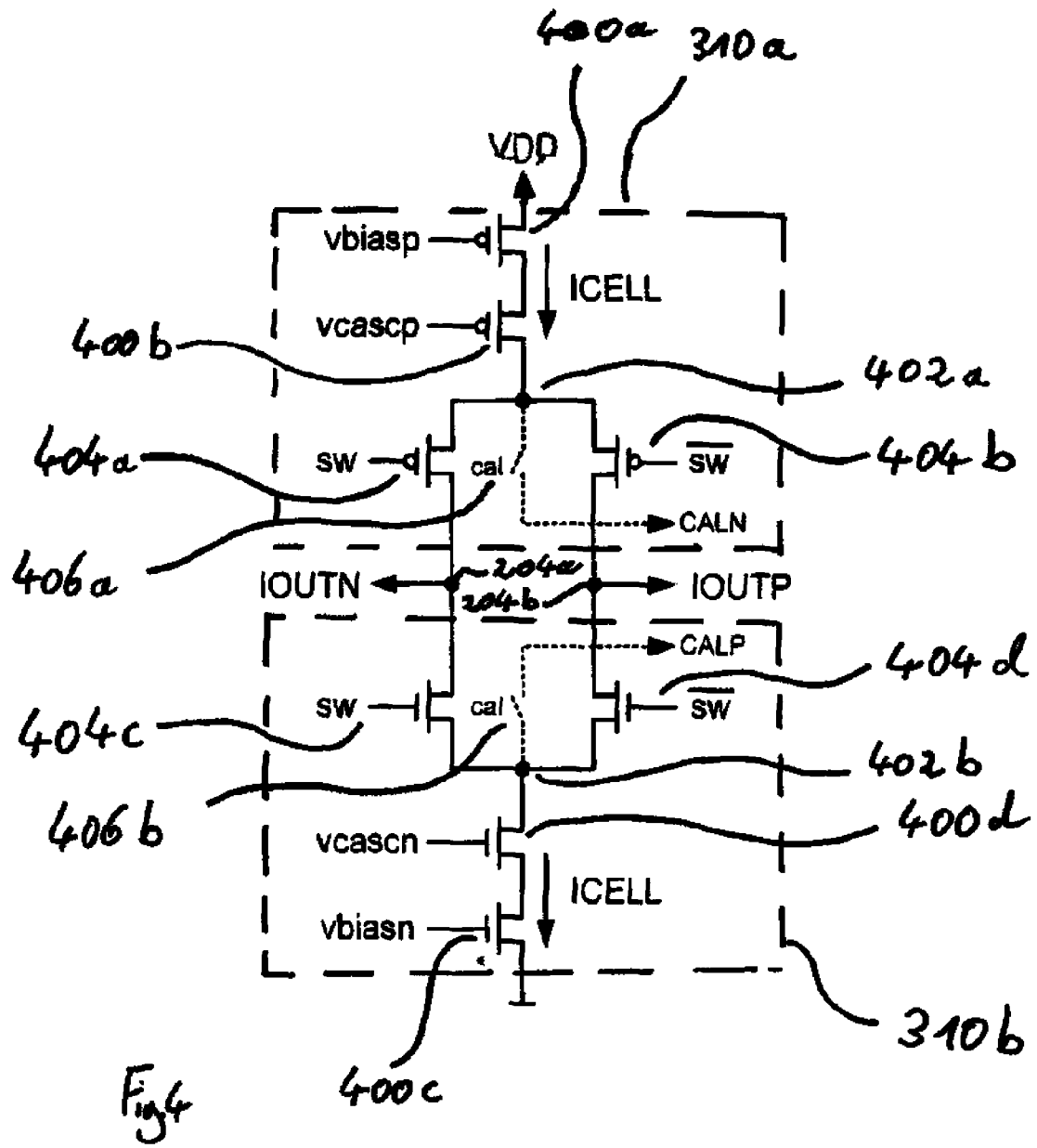
FIG. 4 shows a circuit representation according to an embodiment of the present invention.

FIG. 4 shows a single conversion element 310a of the first plurality of conversion elements and a corresponding single conversion element 310b of the second plurality of conversion elements 310b. Conversion elements 310a and 310b are current cells which are used for converting the digital input applied to the D/A converter into analog signals by supplying a predefined current depending on whether a predefined bit of the digital input is set or not set. To this end, each of the plurality of current cells may be assigned to a bit of the digital input. Conversion elements 310a and 310b shown in FIG. 4 are corresponding conversion elements, i.e. they are assigned to a same bit of the D/A converter. Conversion elements 310a and 310b may be implemented for example in binary weighted, thermometer or segmented D/A conversions. Conversion elements 310a and 310b are coupled to each other to allow push-pull operation.

As can be seen in FIG. 4, the conversion element 310a comprises PMOS transistors 400a, 400b arranged in a cascode structure. The drain of PMOS transistor 400a is coupled to a common power supply VDD and the source of PMOS transistor 400a is coupled to a drain of PMOS transistor 400b. The source of PMOS transistor 400b is coupled to a node 402a.

Node 402a is coupled to a PMOS transistor 404a acting as a first switch to allow supplying the current ICELL of the conversion element from the power supply VDD to the node 204a of the first rail. Node 402a is coupled to a PMOS transistor 404b acting as a second switch to allow supplying the current ICELL of the conversion element from the power supply VDD to the node 204b of the second rail.

As shown in FIG. 4, a further switch 406a may be provided to output the current ICELL of the conversion element for calibration purposes.

Conversion element 310b has a same structure but complementary functionality as conversion element 310a. NMOS transistors 400c and 400d are provided in a cascode structure for sinking a current either from the first rail or the second rail to ground. The source of NMOS transistor 400c is coupled to ground and the drain of NMOS transistor 400c is coupled to the source of NMOS transistor 400d. The drain of NMOS transistor 400d is coupled to a node 402b. Node 402b is coupled to a NMOS transistor 404c acting as a switch to allow supply of the current ICELL of the conversion element ICELL from node 204a of the first rail to ground. Node 402b is further coupled to a NMOS transistor 404d acting as a switch to allow supply of the conversion element current ICELL from node 204b of the second rail to ground.

Similar to the switch 406a provided in the conversion element 310a, a switch 406b is provided in the conversion element 310b for calibration purposes.

In operation, the gates of the cascode transistors 400a and 400b receive bias voltages vbiasp and vcascp, respectively, to control the current ICELL of the conversion element 310a. It is to be noted that at least one of the bias voltages vbiasp, vcascp is based on the analog gain provided to the D/A converter allowing to control the current provided by the conversion element to nodes 204a or 204b to be controlled according to the analog gain as outlined above with respect to FIG. 2. To this end, at least one of the gates of cascode transistors 400a and 400b may be coupled to the control input 202b shown in FIG. 2 to receive information indicating the analog gain to be set in the D/A converter and to program the current of the conversion element by setting the bias voltages vbiasp and/or vcascp accordingly. According to one embodiment, both voltages vbiasp and vcasp may be provided dependent on the analog gain.

Similar to the conversion element 310a, the gates of the cascode transistors 400c and 400d provided in the conversion element 310b receive bias voltages vbiasn and vcascn, respectively, to control the current ICELL of the conversion element 310b, at least one of the bias voltages vbiasp, vcascp being based on the analog gain provided to the D/A converter allowing to control the current provided by the conversion element to nodes 204a or 204b to be controlled according to the analog gain as outlined above with respect to FIG. 2. To this end, at least one of the gates of cascode transistors 400c and 400d may be coupled to the control input 202b shown in FIG. 2 to receive information indicating the analog gain to be set in the D/A converter and to program the current of the conversion element by setting the bias voltages vbiasp and/or vcascp accordingly. According to one embodiment, both voltages vbiasn and vcasn may be provided dependent on the analog gain.

As can be seen from FIG. 4, the conversion elements 310a and 310b are coupled to provide a push pull operation. In the push pull operation, the switching transistors 404a, 404b, 404c and 404d are operated such that conversion element 310a sources the current ICELL from power supply VDD to one of the first or second rail while the conversion element 310b is shut off from this rail and conversion element 310b sinks the current ICELL from the other rail to ground while conversion element 310a is shut off from the other rail.

Figure 5:
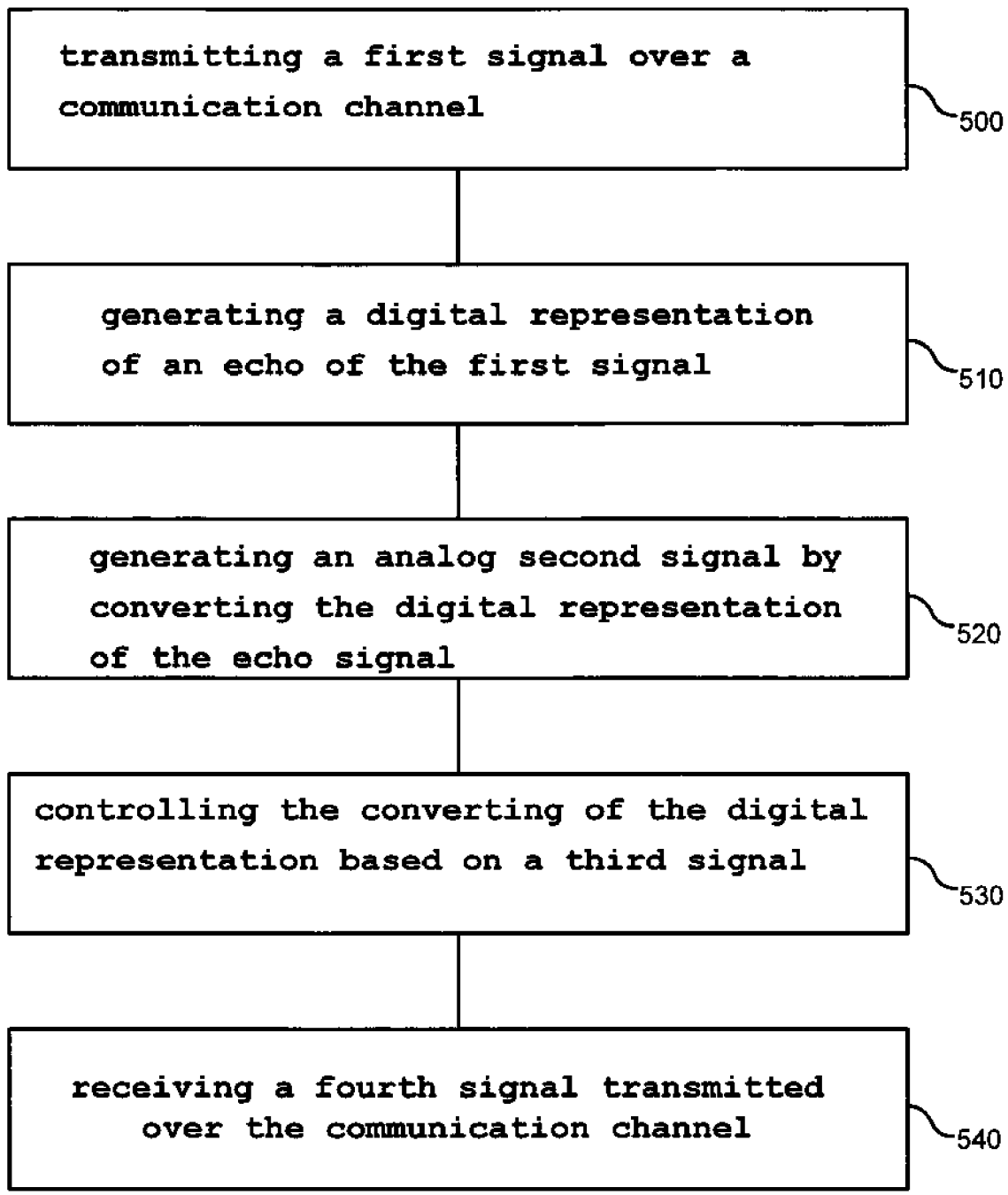
FIG. 5 shows a block diagram of a method according to an embodiment of the present invention.

Referring now to FIG. 5, a method for operating embodiments of the present invention is explained. In a step 500, a first signal, i.e. a transmit signal is transmitted over a communication channel and in a step 510, a digital representation of an echo of the first signal is generated. In a step 520, an analog second signal is generated by converting the digital representation of the echo signal. In step 530, the converting of the digital representation is controlled based on a third signal. As explained above, the third signal may be a control signal provided by a controller to dynamically control or set a digital gain of the digital filter in the echo compensation path. In step 540, a fourth signal transmitted over the communication channel is received and in step 550, an echo compensated signal is generated by combining the second signal and a fifth signal representing the fourth signal. According to one embodiment, the fourth signal may be an analog voltage signal while the fifth and second signal may be analog current signals. As outlined above, the second signal may be injected to a first branch connected to a virtual ground summing node and injecting the second signal to a second branch connected to the virtual ground summing node. The virtual ground summing node may be a summing node of a variable gain amplifier in an AGC circuit of the receive path as described in the above embodiments. Controlling of the converting of the digital representation may be a dynamic controlling of the output current of a D/A converter to rescale the dynamic full scale amplifying provided in the digital filter as described in the above embodiments.

Having now described exemplary embodiments of the present invention, it is to be understood that various modifications of the described embodiments may be implemented.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim.

What is claimed is:

1. An echo cancellation circuit, comprising:
   a digital filter; and
   a digital-to-analog converter, comprising:
      a digital input coupled to the digital filter to receive a digital signal representing digital information of an echo signal,
      a control signal input to receive a control signal, and
      at least one conversion element to generate an analog output signal based on the digital signal,
         wherein the at least one conversion element is controllable by the control signal, and
         wherein the at least one conversion element comprises a programmable current cell operable to program the output current of the cell based on the control signal.

2. The circuit according to claim 1, further comprising a controller coupled to the digital filter to control a gain of the digital filter, the controller further coupled to the control signal input of the digital-to-analog converter.

3. The circuit according to claim 2, wherein the controller is coupled to the digital-to-analog converter to provide the control signal based on the gain of the digital filter.

4. A method comprising:
   transmitting a first signal over a communication channel;
   generating a digital representation of an echo of the first signal;
   generating an analog second signal by converting the digital representation of the echo signal, the generating being performed by a digital-to-analog converter;
   controlling the converting of the digital representation based on a third signal;
   receiving a fourth signal transmitted over the communication channel;
   generating an echo compensated signal by combining the second signal and a fifth signal representing the fourth signal.

5. The method according to claim 4, wherein controlling the converting of the digital representation comprises controlling the output current of a plurality of current cells of a digital-to-analog converter based on the third signal.

6. The method according to claim 5, wherein generating a digital representation of an echo of the first signal comprises:
   digital filtering a digital representation of the first signal; and
   controlling the digital filtering to provide a digital signal corresponding to the echo signal scaled by a first gain factor; and
   wherein the controlling of the digital conversion comprises rescaling the output current dependent on the first gain factor.

7. The method according to claim 4, wherein the second and fifth signal are current signals and combining the signals comprises:
   injecting the fifth signal to a first branch of a virtual ground summing node and injecting the second signal to a second branch of the virtual ground summing node.

8. The method according to claim 7, wherein the virtual ground summing node is a summing node of a variable gain amplifier in an AGC circuit of a receive path.

9. A transceiver circuit, comprising:
   a transmit path comprising a first output to transmit a first signal;
   a receive path comprising a first input to receive a second signal;
   an echo cancellation path;
   first circuitry to combine the echo cancellation path with the receive path, the first circuitry comprising:
      a virtual ground node of a variable gain amplifier arranged in the receive path,
      a first branch to connect the virtual ground node with the first input,
      a second branch to connect the virtual ground node with an input of the variable gain amplifier, and
      a third branch to connect the echo cancellation path with the virtual ground node; and
   a digital-to-analog conversion circuit arranged in the echo cancellation path, the digital-to-analog conversion circuit comprising:
      an input coupled to the transmit path to receive a digital signal and an output coupled to the virtual ground node,
      a first digital input for receiving the digital signal,
      a second input to receive a control signal, and
      a plurality of current cells, each of the current cells being programmable dependent on the control signal, wherein the digital-to-analog conversion circuit is to provide an output current dependent on the digital signal and the control signal.

10. The circuit according to claim 9, wherein the first circuitry is to inject a first current to the virtual ground node via the first branch and to inject a second compensation current to the virtual ground node via the third branch.

11. The circuit according to claim 9, wherein the variable gain amplifier is implemented in an AGC circuit of the receive path.

12. The circuit according to claim 9, wherein each of the current generating elements comprises at least one switch coupled to the first digital input to switch the current based on a bit representation the digital signal received at the first digital input.

13. The circuit according to claim 12, wherein at least one of the plurality of current generating elements is implemented in a push-pull structure.

14. The circuit according to claim 9, further comprising a controller to provide the control signal to the second input of the digital-to-analog converter, the controller further being operable to set a gain of a digital filter in the echo cancellation path.

15. The circuit according to claim 14, wherein the controller is operable to provide the control signal based on the gain of the digital filter set by the controller.

16. An echo cancellation circuit, comprising:
a digital filter;
a controller to set a first digital gain of the digital filter;
first circuitry to convert digital information provided by the digital filter to an analog signal;
second circuitry to set a second analog gain to compensate the digital gain,
wherein the second circuitry is integrated in the first circuitry, and
wherein the second circuitry comprises programmable current cells provided in the first circuitry.

* * * * *